United States Patent
Lee et al.

(10) Patent No.: US 9,144,106 B2
(45) Date of Patent: Sep. 22, 2015

(54) METHOD FOR CARRIER MANAGEMENT IN A CARRIER AGGREGATION ENVIRONMENT OF A MOBILE COMMUNICATION SYSTEM

(75) Inventors: Kyoung Seok Lee, Daejeon (KR); Jae Heung Kim, Daejeon (KR); Kook Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 69 days.

(21) Appl. No.: 13/884,216

(22) PCT Filed: Nov. 7, 2011

(86) PCT No.: PCT/KR2011/008404
§ 371 (c)(1),
(2), (4) Date: May 8, 2013

(87) PCT Pub. No.: WO2012/064052
PCT Pub. Date: May 18, 2012

(65) Prior Publication Data
US 2013/0230009 A1    Sep. 5, 2013

(30) Foreign Application Priority Data

Aug. 12, 2010   (KR) ........................ 10-2010-0077880
Nov. 8, 2010   (KR) ........................ 10-2010-0110649

(51) Int. Cl.
*H04W 76/06*     (2009.01)
*H04W 72/02*     (2009.01)
(Continued)

(52) U.S. Cl.
CPC ........... *H04W 76/068* (2013.01); *H04L 1/1825* (2013.01); *H04L 1/1854* (2013.01);
(Continued)

(58) Field of Classification Search
CPC ..... H04W 72/02; H04W 72/04; H04W 72/12; H04L 27/0014; H04L 5/003; H04L 27/00143; H04L 27/2657
USPC ......... 370/252, 277, 282, 329, 341, 350, 503, 370/464–465
See application file for complete search history.

(56) References Cited

U.S. PATENT DOCUMENTS 8,270,988 B1 *   9/2012   Sarkar et al. ................ 455/452.1
8,855,132 B2 *   10/2014   Lohr et al. .................... 370/431
(Continued)

FOREIGN PATENT DOCUMENTS

| KR | 10-2009-0074279 | 7/2009 |
| KR | 10-2010-0118067 | 11/2010 |
| WO | 2012/064052 A3 | 5/2012 |

OTHER PUBLICATIONS

Ericsson, ST-Ericsson, "DRX with Carrier Aggregation in LTE-Advanced," 3GPP TSG-RAN WG2 #67bis, Tdoc R2-095809, 4 pages (2009).
(Continued)

*Primary Examiner* — Warner Wong
(74) *Attorney, Agent, or Firm* — NSIP Law

(57) ABSTRACT

Disclosed is a carrier management method for use in a carrier aggregation environment of a mobile communication system. In the method, a base station is configured to transmit a deactivation message for a secondary carrier to a terminal and change the secondary carrier to a deactivation state after a predetermined time from the transmission of the deactivation message. The terminal receives the deactivation message transmitted by the base station, and changes the secondary carrier to the deactivation state after a predetermined time from the transmission of the deactivation message. As the predetermined time, a predefined value may be used to prevent inconsistency of secondary-carrier state information that is managed by the base station and the terminal. If the carrier state management information is used, it is possible to prevent inconsistency of secondary-carrier states that are managed by the base station and the terminal and solve problems due to the inconsistency.

8 Claims, 5 Drawing Sheets

(51) Int. Cl.
   *H04L 1/18* (2006.01)
   *H04L 5/00* (2006.01)
   *H04W 72/04* (2009.01)
   *H04W 76/04* (2009.01)
   *H04L 1/00* (2006.01)
   *H04W 24/00* (2009.01)
   *H04W 28/04* (2009.01)
   *H04W 28/06* (2009.01)
   *H04W 48/08* (2009.01)
   *H04W 72/00* (2009.01)

(52) U.S. Cl.
   CPC ............ *H04L1/1864* (2013.01); *H04L 1/1887* (2013.01); *H04L 1/1896* (2013.01); *H04L 5/001* (2013.01); *H04L 5/0098* (2013.01); *H04W 72/02* (2013.01); *H04W 72/04* (2013.01); *H04W 72/0406* (2013.01); *H04W 76/048* (2013.01); *H04L 1/0026* (2013.01); *H04W 24/00* (2013.01); *H04W 28/04* (2013.01); *H04W 28/06* (2013.01); *H04W 48/08* (2013.01); *H04W 72/00* (2013.01)

(56) References Cited

U.S. PATENT DOCUMENTS

| | | | | |
|---|---|---|---|---|
| 8,976,694 | B2* | 3/2015 | Feuersanger et al. | 370/252 |
| 2010/0020733 | A1* | 1/2010 | Hartman | 370/311 |
| 2010/0130137 | A1 | 5/2010 | Pelletier et al. | |
| 2010/0130219 | A1* | 5/2010 | Cave et al. | 455/450 |
| 2010/0240406 | A1* | 9/2010 | Tseng | 455/509 |
| 2010/0304786 | A1* | 12/2010 | Ou | 455/552.1 |
| 2011/0002281 | A1* | 1/2011 | Terry et al. | 370/329 |
| 2011/0103331 | A1* | 5/2011 | Kuo | 370/329 |
| 2011/0150743 | A1* | 6/2011 | Dubois | 423/376 |
| 2011/0243048 | A1* | 10/2011 | Wang et al. | 370/311 |
| 2011/0243106 | A1* | 10/2011 | Hsu et al. | 370/336 |
| 2014/0328284 | A1* | 11/2014 | Jang et al. | 370/329 |

OTHER PUBLICATIONS

International Search Report and Written Opinion for Application No. PCT/KR2011/008404, 14 pages, dated May 29, 2012.

* cited by examiner

METHOD FOR CARRIER MANAGEMENT IN A CARRIER AGGREGATION ENVIRONMENT OF A MOBILE COMMUNICATION SYSTEM

CROSS-REFERENCE TO RELATED APPLICATIONS

This application is a 35 U.S.C. §371 National Stage filing of International Application No. PCT/KR2011/008404 which was filed Nov. 7, 2011, and which claims the benefit of, Korean Application No. 10-2010-0110649, filed on Nov. 8, 2010, Korean Application No. 10-2010-0077880, filed on Aug. 12, 2010, and U.S. Utility application Ser. No. 13/208, 471, the entire disclosures of which are incorporated herein by reference for all purposes.

TECHNICAL FIELD

The present invention relates to a Long Term Evolution (LTE)-Advanced system, which is next-generation mobile communication being standardized by the 3rd Generation Partnership Project (3GPP), and more particularly to a carrier management method of performing a carrier deactivation procedure between a base station and a terminal in a carrier aggregation environment in which communication between the base station and the terminal is performed using a plurality of carriers.

BACKGROUND ART

3GPP, which is a mobile communication standardization organization, has developed an LTE system standard as a next-generation mobile communication standard. Also, the development of the LTE-Advanced system standard as an extension of the LTE standard is under way to satisfy International Mobile Telecommunication (IMT)-Advanced system requirements proposed by the International Telecommunication Union-Radio communication Sector (ITU-R).

While the LTE standard supports a maximum radio bandwidth of 20 MHz, the LTE-Advanced standard uses bandwidth aggregation (carrier aggregation) to support a maximum bandwidth of 100 MHz. Thus, in the LTE-Advanced standard, the bandwidth of 100 MHz is divided into component carriers (CCs), each of which has a maximum bandwidth of 20 MHz, and a base station may communicate with a terminal by simultaneously using a plurality of carriers.

The terminal, which supports multicarrier communication, uses a plurality of radio channels in a broad band. The wider a frequency bandwidth for use in communication, the higher the power consumption. Therefore, the terminal of the LTE-Advanced system is configured to activate and use multiple carriers only when traffic is high and to perform communication using only a single carrier when traffic is low.

On the other hand, when a secondary carrier is configured and operated in the multicarrier environment, a secondary carrier deactivation procedure and a discontinuous reception (DRX) procedure should be stably controlled, and thus a management state is not consistent between the base station and the terminal. In addition, when the deactivation procedure is performed, a hybrid automatic repeat request (HARQ) retransmission procedure to be performed in the terminal should be managed according to a deactivation state.

DISCLOSURE

Technical Problem

An object of the present invention is to provide a carrier management method of a base station capable of preventing inconsistency of carrier states that are managed by the base station and a terminal when a secondary carrier, which is configured and operated in a carrier aggregation environment, is deactivated, as a carrier state management method of the base station.

Another object of the present invention is to provide a carrier management method of a terminal capable of preventing inconsistency of carrier states that are managed by a base station and the terminal when a secondary carrier, which is configured and operated in a carrier aggregation environment, is deactivated, as a carrier state management method of the terminal.

Technical Solution

According to an example for achieving the object of the present invention described above, there is provided a carrier state management method of a base station for use in a carrier aggregation environment, including: transmitting a deactivation message for a secondary carrier to a terminal; and changing the secondary carrier to a deactivation state after a predetermined time from the transmission of the deactivation message.

Here, the predetermined time may be a value predefined to make state information that is managed by the base station consistent with state information that is managed by the terminal for the secondary carrier.

Here, the example of the carrier state management method of the base station may further include: receiving a reception success message for the deactivation message from the terminal after transmitting the deactivation message, wherein the changing of the secondary carrier to the deactivation state includes: changing, by the base station, the secondary carrier to the deactivation state after a predetermined time from an arrival time of the reception success message.

Here, the example of the carrier state management method of the base station may further include immediately stopping, by the base station, data transmission and retransmission using the secondary carrier immediately after transmitting the deactivation message.

Here, the example of the carrier state management method of the base station may further include: stopping downlink (DL) transmission of the secondary carrier and initializing uplink (UL) and DL retransmission buffers after transmitting the deactivation message.

According to another example for achieving the object of the present invention described above, there is provided a carrier state management method of a base station for use in a carrier aggregation environment, including: determining whether or not to change a secondary-carrier state to a deactivation state by determining whether or not transmission/reception through a secondary carrier has been performed for a given time; and changing the secondary carrier to the deactivation state after a predetermined time from when the change of the secondary carrier to the deactivation state is determined.

Here, the determining of whether or not to change the secondary-carrier state to the deactivation state may be performed using a predetermined timer.

Here, the predetermined time may be a value predefined to make state information that is managed by the base station consistent with state information that is managed by the terminal for the secondary carrier.

According to another example for achieving the object of the present invention described above, there is provided a carrier state management method of a terminal for use in a carrier aggregation environment, including: receiving a deactivation message for a secondary carrier from a base station; and changing the secondary carrier to a deactivation state after a predetermined time from the reception of the deactivation message.

Here, the predetermined time may be a value predefined to make state information that is managed by the base station consistent with state information that is managed by the terminal for the secondary carrier.

Here, the example of the carrier state management method may further include: transmitting a reception success message for the deactivation message to the base station after receiving the deactivation message, wherein the changing of the secondary carrier to the deactivation state includes: changing, by the terminal, the secondary carrier to the deactivation state after a predetermined time from a transmission time of the reception success message.

Here, the example of the carrier state management method of the terminal may further include: immediately stopping, by the terminal, data transmission and retransmission using the secondary carrier immediately after receiving the deactivation message.

Here, the example of the carrier state management method of the terminal may further include: stopping UL transmission of the secondary carrier and initializing UL and DL retransmission buffers after receiving the deactivation message.

According to another example for achieving the object of the present invention described above, there is provided a carrier management method of a terminal for use in a carrier aggregation environment, including: determining whether or not to change a secondary-carrier state to a deactivation state by determining whether or not transmission/reception through a secondary carrier has been performed for a given time; and changing the secondary carrier to the deactivation state after a predetermined time from when the change of the secondary carrier to the deactivation state is determined.

Here, the determining of whether or not to change the secondary-carrier state to the deactivation state may be performed using a predetermined timer.

Here, the predetermined time may be a value predefined to make state information that is managed by the terminal consistent with state information that is managed by the base station for the secondary carrier.

Advantageous Effects

If a carrier management method according to the present invention as described above is used, it is possible to prevent an increase in the number of unnecessary retransmissions in a mobile communication system using carrier aggregation. That is, according to the present invention, when a secondary carrier is deactivated in a carrier aggregation environment, a DL retransmission buffer of a terminal is immediately initialized. Accordingly, the terminal stops a reception operation of a carrier, so that an unnecessary retransmission procedure of the terminal may be omitted and operations of the terminal and a base station may be consistent.

Thus, it is possible to reduce an unnecessary retransmission operation and power consumption of the terminal and prevent the waste of radio resources and the performance degradation of the base station due to unnecessary retransmission.

In addition, it is possible to prevent inconsistency of secondary carrier states that are managed by the base station and the terminal when a secondary carrier is deactivated according to the present invention. It is possible to solve a problem of an unnecessary wakeup operation of a terminal by a DRX procedure related to a deactivated carrier by initializing a DRX-related timer that operates in a secondary carrier. Accordingly, power consumption of the terminal is reduced. In particular, the effect of power consumption reduction is increased because the above-described procedure affects operations of all carriers rather than a secondary carrier.

MODES OF THE INVENTION

Figure 1:
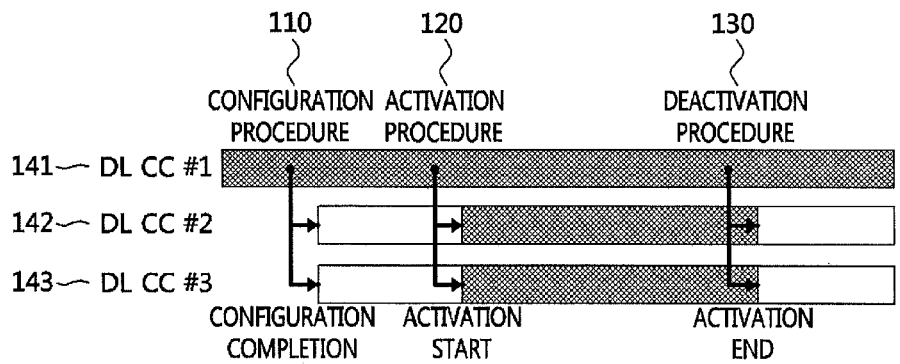
FIG. 1 is a conceptual diagram illustrating a general procedure in which a base station configures and activates carriers for a terminal in a carrier aggregation environment.

While the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" may refer to a mobile station (MS), user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, or other terms. Various example embodiments of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, and also portable units or terminals having a combination of such functions, but the present invention is not limited thereto.

The term "base station" used herein generally denotes a fixed or moving point communicating with a terminal, and may be referred to as a Node-B, evolved Node-B (eNB), base transceiver system (BTS), access point, relay, femtocell, and other terms. In the present invention, the term "base station" is used to mean a control device that controls one cell. In an actual communication system, a "physical base station" may control a plurality of cells. In this case, the physical base station may include a plurality of base stations in the present invention. That is, when a different parameter is allocated to each cell, each base station may allocate a different value.

The term "carrier" used in the present invention refers to a medium for transmitting a radio channel in a specific frequency band for wireless communication by the base station, and hence has the same meaning as a mobile communication cell. In other words, the terminal of the present invention may receive and communicate radio channels transmitted in a plurality of cells. In addition, the term "carrier" may be used as the term indicating one CC among a plurality of CCs constituting a carrier aggregation environment.

With reference to the appended drawings, preferred embodiments of the present invention will be described in detail below. To aid in understanding the present invention, like numbers refer to like elements throughout the description of the figures, and the description of the same component will not be reiterated.

FIG. 1 is a conceptual diagram illustrating a general procedure in which a base station configures and activates carriers for a terminal in a carrier aggregation environment.

Referring to FIG. 1, the LTE-Advanced system controls a configuration procedure 110, an activation procedure 120, and a deactivation procedure 130 into which a multicarrier management step is divided. Although a maximum of five CCs may currently exist in the LTE-Advanced standard, an example in which three CCs, or downlink (DL) CC #1 (141), DL CC #2 (142), and DL CC #3 (143), are used as DL CCs is shown in FIG. 1.

When the terminal is connected to the base station that provides multicarrier communication, a multicarrier communication environment is constructed using the configuration procedure. The base station transmits a configuration message to cause the terminal to store configuration information regarding multicarrier communication and prepare carrier communication.

When traffic is low, the terminal communicates with the base station by use of only single carriers (DL CC #1 of FIG. 1 and UL CC #1 (not shown)). In a state in which the single carrier is used, the used carrier is referred to as a primary carrier or a primary cell. A radio channel state of the primary carrier is measured in a short cycle and managed as a state in which stable communication is possible.

When traffic of the terminal increases, the base station uses the activation procedure to cause the terminal to actually use a plurality of CCs. A carrier to be additionally activated for the multicarrier environment is referred to as a secondary carrier or a secondary cell of which a radio channel state is managed at a lower level than that of the primary carrier.

The term "carrier" used in the LTE-Advanced system refers to a medium for transmitting a radio channel in a specific frequency band for wireless communication by the base station, and hence has the same meaning as a mobile communication cell. In other words, the terminal of the present invention may simultaneously receive and communicate radio channels transmitted in a plurality of cells.

In order to activate the secondary carrier, the base station transmits an activation message to the terminal. Upon receipt of the message, the terminal activates the secondary carrier and uses the activated secondary carrier in communication.

Accordingly, a large volume of data is transmitted and received by multiple carriers, and a data transmission rate is increased. If traffic with the terminal is decreased, the base station transmits a deactivation message to cause the terminal to make a change for use of only a single carrier. DL and UL CCs may be independently configured/released and activated/deactivated. Through one message, the DL and UL CCs may be simultaneously activated/deactivated.

When multicarrier communication is performed, data is mapped and transmitted according to each CC. A scheduler of the base station divides data to be transmitted in units of CCs, and the divided data is allocated and transmitted according to each CC. Transmitted data is retransmitted using the same CC.

Based on FIG. 1, one data block is assigned to DL CC #1. If a data reception error occurs after initial transmission, retransmission (or HARQ) should be performed using DL CC #1. When DL data is transmitted, the data is allocated to a data channel (that is, a physical downlink shared channel (PDSCH)), and demodulation information of the data channel is indicated and transmitted on a control channel (that is, a physical downlink control channel (PDCCH)).

The control channel may be transmitted by the same CC as the data channel or a different CC. If CC positions are different from each other, a position of the data channel is indicated using a carrier indicator (or a carrier indicator field (CIF)) within the control channel.

If traffic between the base station and the terminal increases and a radio channel state of some CCs becomes bad in a state in which multiple carriers are used, the number of data reception errors of a receiver increases and the number of retransmissions increases. In particular, if a radio channel state of a CC becomes bad in a structure in which retransmission is performed by only a CC used during initial transmission as in the LTE-Advanced system, there is a problem in that the number of reception errors rapidly increases.

Also, there is a problem in that data transmitted once is retransmitted until reception succeeds during a maximum number of retransmissions, regardless of a radio channel state. This procedure leads to unnecessary retransmission operations and power consumption of the terminal. There is a problem in that the waste of radio resources and the degradation of base station performance occur because other terminals may not use resources due to unnecessary retransmission.

Figure 2:
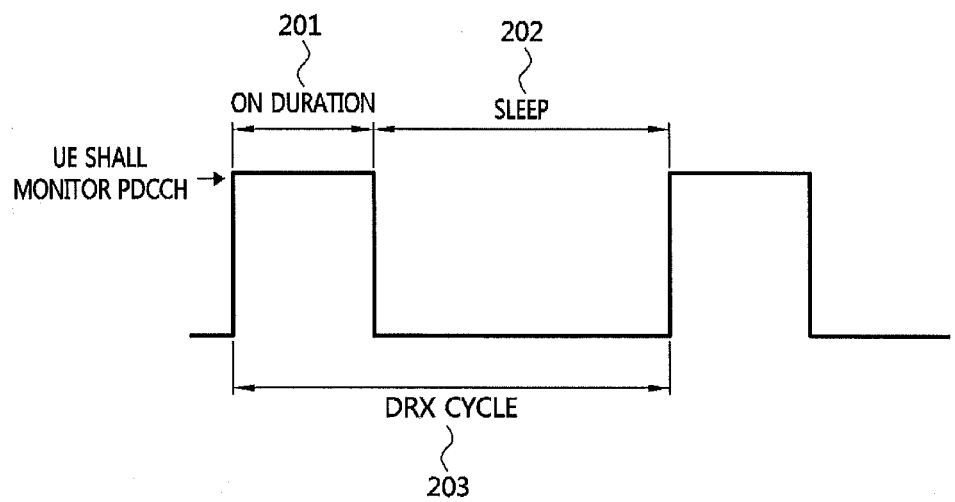
FIG. 2 is a conceptual diagram illustrating a power consumption reduction (DRX) operation of the terminal in a mobile communication system.

FIG. 2 is a conceptual diagram illustrating a power consumption reduction (DRX) operation of the terminal in a mobile communication system.

Referring to FIG. 2, the terminal is controlled by dividing a period into an on-duration period 201 in which an operation of receiving a DL control channel transmitted from the base station is performed and a sleep period 202 in which an operation of reducing power consumption is performed by stopping a reception operation.

If the base station does not transmit a control channel to the terminal in an on-duration mode, the terminal determines that it is not necessary to receive data and is switched to a sleep mode. If the control channel is received in the on-duration mode, a wakeup state is maintained for a given time by use of an inactivity timer. A cycle in which the terminal performs an on-duration operation is indicated as a DRX cycle 203. The DRX cycle is divided into long DRX and short DRX. In the long DRX, it is possible to minimize power consumption because a data reception cycle of the terminal is long.

In the mobile communication system of the multicarrier structure, all carriers use the same DRX operation procedure. All activated carriers perform the on-duration operation when one carrier is in the on-duration mode, and also the sleep state is equally applied to all carriers.

In order to maintain the DRX operation of each carrier, a DRX-related timer is managed according to each carrier. If one carrier performs a DL control channel reception operation by the timer, all carriers are in a wakeup mode, thereby performing the same wakeup operation.

DL Carrier Management Method According to Present Invention

In a mobile communication system based on frequency division duplexing (FDD), a terminal measures a DL radio channel state, and transmits measured channel state information (CSI) to a base station. At this time, the base station manages the radio channel state of a carrier by analyzing the received DL CSI and uses the CSI as information for scheduling.

In a mobile communication system based on time division duplexing (TDD), the base station may recognize a DL radio channel state to manage the radio channel state by analyzing a UL radio channel state because the same frequency band is used in UL and DL.

Figure 3:
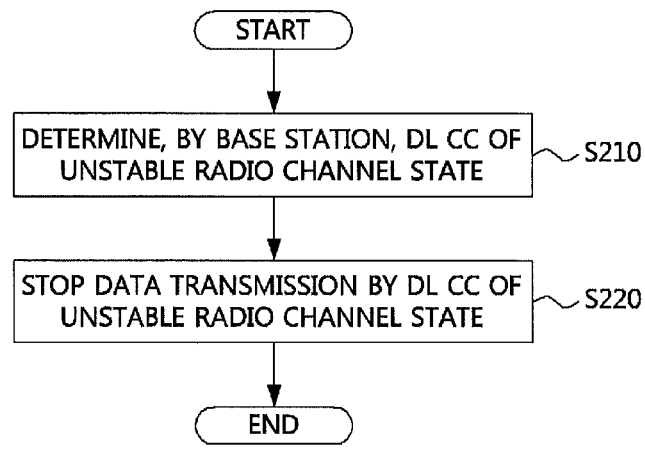
FIG. 3 is a flowchart illustrating a DL carrier management method according to the present invention.

FIG. 3 is a flowchart illustrating a DL carrier management method according to the present invention.

According to the present invention, the DL carrier management method may be configured as a DL carrier management method in a carrier aggregation environment so that the base station determines a DL CC of an unstable radio channel state among multiple carriers of carrier aggregation and stops data transmission by the CC.

Referring to FIG. 3, the DL carrier management method according to the present invention may be configured to include the step (S210) of determining, by the base station, a DL CC of an unstable radio channel state and the step (S220) of stopping data transmission by the DL CC of the unstable radio channel state determined in step S210.

First, in step S210, the determination of the radio channel state may be made on the basis of radio CSI received from the terminal, or the base station may directly measure and determine the radio channel state. For example, the determination may be made on the basis of whether a channel state value recognized from the received CSI is equal to or less than a given threshold reference value for a given time.

If data reception success information is not received from the terminal a given number of times or more in step S210, the base station may be configured to determine that a radio channel state of a carrier is unstable. Cases where the base station does not receive the data reception success information include when the base station receives reception failure information (NACK) or does not receive reception success information (ACK) or reception failure information (NACK) during a designated reception period (when reception fails).

Next, if it is determined that a DL CC is in an unstable radio channel state in step S210, the step (S220) of stopping data transmission by the DL CC of the unstable radio channel state is performed.

In step S220, the base station stops data allocation to the DL CC. In step S220, the base station may be configured to perform the step of transmitting a notification message for stopping retransmission by the DL CC to the terminal through another DL CC.

A carrier for use in the message transmission may be a primary carrier or a secondary carrier of a good radio channel state, and a position of the carrier for use in the message transmission may be indicated using a CIF.

Figure 4:
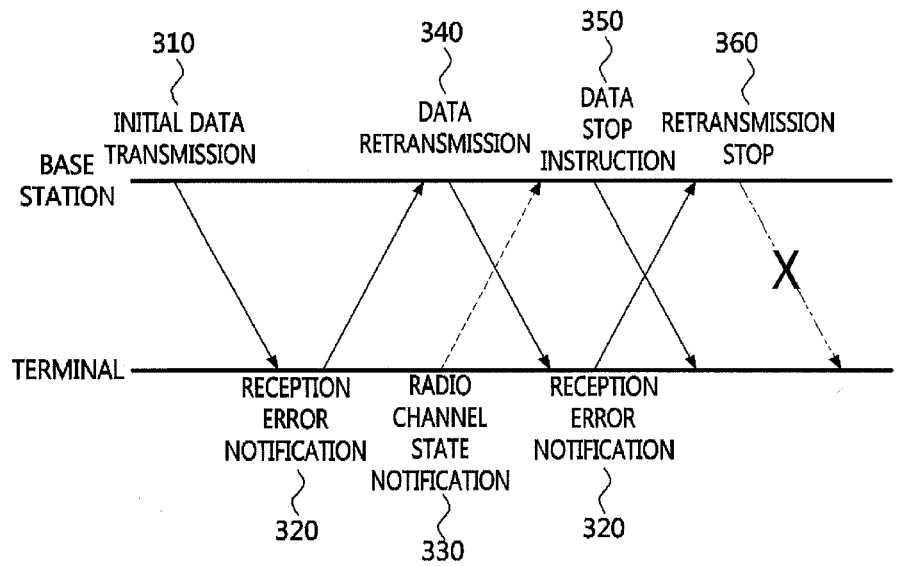
FIG. 4 is a conceptual diagram illustrating a DL data retransmission stop procedure in a carrier aggregation environment according to the present invention.

FIG. 4 is a conceptual diagram illustrating a DL data retransmission stop procedure in a carrier aggregation environment according to the present invention.

In general, a data transmission procedure between the base station and the terminal is accomplished by iterating initial data transmission 310, the terminal's reception error notification 320, radio channel state notification 330, and the base station's data retransmission 340.

In the above-described DL carrier management method according to the present invention, the base station determines whether a radio channel state of some DL CCs is bad on the basis of radio channel state notification 330 or reception error notification 320 of a multicarrier received from the terminal and non-reception of reception error notification, notifies the terminal of stop of data transmission by a CC of a bad radio channel state (350), and stops the data transmission by the CC (360). Of course, the data transmission stop notification 350 and the data transmission stop 360 may be performed in reverse order.

Thus, if a transmission stop instruction is received, the terminal stops the reception error notification or retransmission procedure.

Here, methods in which the base station transmits retransmission stop information to the terminal may include a method using a control channel, a method using a data channel, and the like. Hereinafter, four methods will be described in detail.

1) Method using Control Channel (PDCCH)

A carrier retransmission stop indication is included in the control channel and transmitted to the terminal, and an indication method may use some fields of the control channel (for example, a transport block (TB) field).

At this time, information regarding a carrier of which retransmission is stopped may be indicated using a carrier identifier (or CIF) in the control channel.

Information regarding data of which retransmission is stopped may be indicated by a retransmission-related field (for example, a new data indicator (NDI) field or a redundancy version (RV) field) or a distinguishable value, so that the stop of all data transmissions by a CC may be indicated.

2) Method using Data Channel (PDSCH)

A carrier retransmission stop indication is included in the data channel and transmitted to the terminal. An information indication method may be configured to provide retransmission stop notification by defining a predetermined field as in the method using the control channel.

The above-described control information may be configured by a new control message (or medium access control (MAC) control element).

3) Method using Existing Method

An indication of new data transmission, not previous data retransmission, is included in the control channel (for example, new data transmission is indicated by changing (or toggling) the NDI field of PDCCH), and resource consumption may be avoided by minimizing and allocating a size of the data channel to be allocated (or the TB field).

At this time, meaningless data (or padding) may be transmitted on the data channel so as to avoid data transmission delay using an unstable channel. It is possible to transmit retransmission stop control information described above.

4) Method using CC Deactivation Message

Using an existing carrier deactivation message, the base station transmits a deactivation message for a DL CC to the terminal. If the deactivation message is received, the terminal performs a procedure of deactivating the DL CC and the base station may simultaneously stop all transmission (initial transmission and retransmission) by the DL CC.

On the other hand, the terminal receiving the data transmission stop notification using the above-described method may be configured to notify the base station of the fact that a stop message has been successfully received.

In the present invention, if the terminal is notified of retransmission stop information, the terminal may be configured to stop a data retransmission procedure by terminating a control channel reception operation for retransmission data reception by a designated carrier. A demodulation operation error of retransmission is prevented by initializing a reception buffer of the carrier or a retransmission block.

If a retransmission procedure of a carrier is stopped, an operation (DRX) for reducing power consumption or a carrier deactivation procedure may be performed. In further detail, the terminal does not perform the DRX operation by demodulating a control channel for a given time so as to receive data in which a reception error has occurred. If the procedure of the present invention is used, the terminal may immediately stop the control channel demodulation operation and perform the DRX operation.

In the method of the related art, data initially transmitted by a specific DL CC is iteratively retransmitted by a CC up to a preset maximum number of times (for example, 8 times) even when a radio channel state is unstable. However, in the DL channel management method according to the present invention, it is possible to reduce power consumption of the terminal, the waste of radio resources due to unnecessary retransmissions, and the degradation of base station performance by preventing an unnecessary retransmission operation for the terminal in an unstable radio channel state.

UL Carrier Management Method According to Present Invention

The base station measures a UL radio channel state, manages a radio channel state of a received carrier, and uses it as UL scheduling information. UL scheduling is performed by the base station. The base station transmits UL carrier information, information regarding a transmission data size, and the like to be used by the terminal determined by scheduling to the terminal through a control channel (PDCCH).

As a UL carrier management method in a carrier aggregation environment, the UL carrier management method according to the present invention may be configured so that the base station determines a UL CC of an unstable radio channel state among multiple carriers and instructs the terminal to stop data transmission by the UL CC. At this time, if the instruction to stop data transmission by the UL CC of the unstable radio channel state is received from the base station, the terminal may be configured to stop data retransmission by the UL CC and initialize a retransmission buffer of the designated UL CC.

Figure 5:
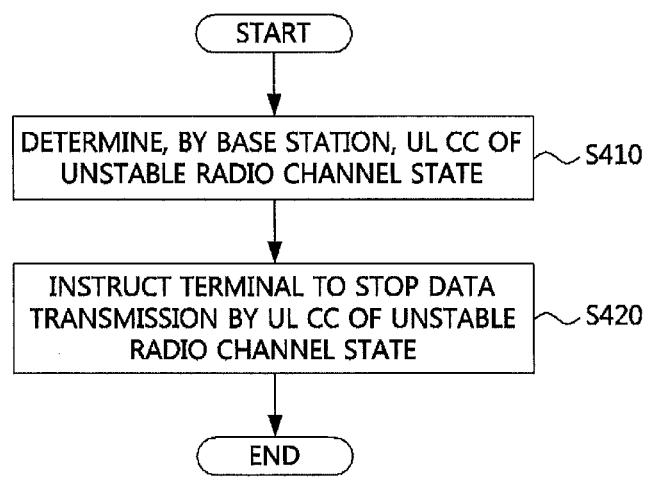
FIG. 5 is a flowchart illustrating a UL carrier management method on the side of a base station according to the present invention.
Figure 6:
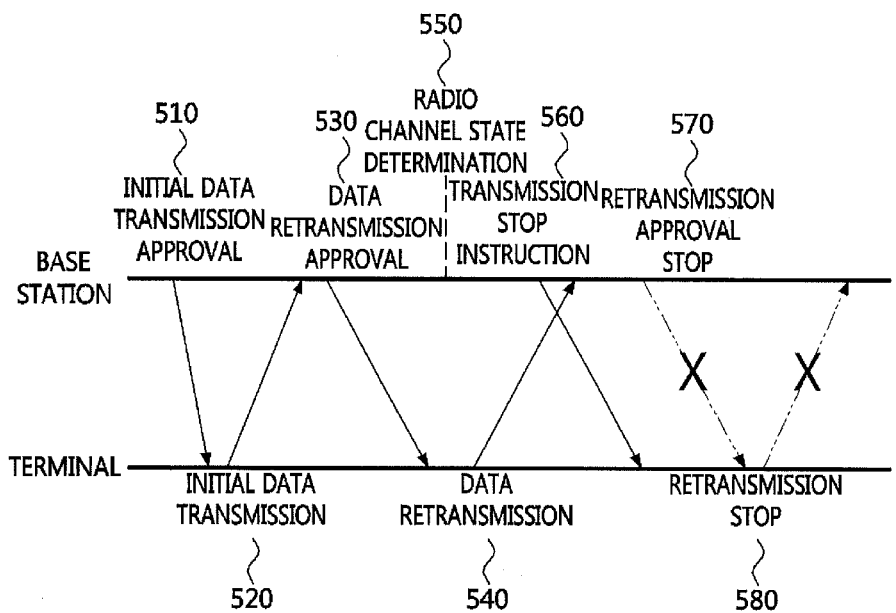
FIG. 6 is a conceptual diagram illustrating a UL data retransmission stop procedure in a carrier aggregation environment according to the present invention.
Figure 7:
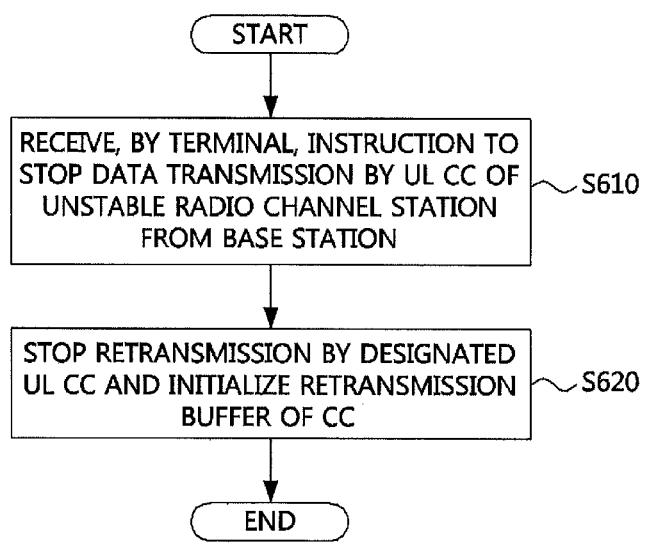
FIG. 7 is a flowchart illustrating a UL carrier management method on the side of a terminal according to the present invention.

Hereinafter, UL carrier management methods according to the present invention will be described separately on the side of the base station and the side of the terminal. FIG. 5 illustrates the UL carrier management method on the side of the base station according to the present invention, and FIG. 7 illustrates the UL carrier management method on the side of the terminal according to the present invention. FIG. 6 is a conceptual diagram illustrating a UL data retransmission stop procedure in the carrier aggregation environment according to the present invention, and is referred to in FIGS. 5 and 7.

FIG. 5 is a flowchart illustrating the UL carrier management method on the side of the base station according to the present invention.

Referring to FIG. 5, the UL carrier management method on the side of the base station according to the present invention may be configured to include the step (S410) of determining, by the base station, a UL CC of an unstable radio channel state among multiple carriers and the step (S420) of instructing the terminal to stop data transmission by the UL CC of the unstable radio channel state determined in step S410.

First, in step S410, the determination of the radio channel state may be made by determining whether a channel state value of the UL CC is equal to or less than a reference value for a given time by use of radio CSI collected by the base station or determining whether the number of reception errors of UL data received by the UL CC from the terminal is equal to or greater than a reference value for a given time.

Next, in step S420, methods of instructing the terminal to stop data transmission may include a method using a control channel, a method using a data channel, and the like. Hereinafter, four methods will be described in detail.

1) Method using Control Channel (PDCCH)

A data transmission stop indication is included in the control channel and transmitted to the terminal, and an indication method may use some fields of the control channel (for example, a TB field).

At this time, a UL CC of which retransmission is stopped may be indicated using a carrier identifier (or CIF) in the control channel.

Information regarding data of which retransmission is stopped may be indicated by a retransmission-related field (for example, an NDI field or an RV field) or a distinguishable value, so that the stop of all data transmissions by the UL CC may be indicated.

2) Method using Data Channel (PDSCH)

A UL CC retransmission stop indication is included in the data channel and transmitted to the terminal. An information indication method may be configured to provide retransmission stop notification by defining a predetermined field as in the method using the control channel.

The above-described control information may be configured by a new control message (or MAC control element).

3) Method using Existing Method

An indication of new data transmission, not previous data retransmission, is included in the control channel (for example, new data transmission is indicated by changing (or toggling) the NDI field of PDCCH), and resource consumption may be avoided when the terminal transmits UL data by minimizing and allocating a size of the data channel to be allocated (or the TB field).

At this time, the terminal may transmit meaningless data (or padding) on the data channel so as to avoid data transmission delay using an unstable channel.

4) Method using CC Deactivation Message

If the base station instructs the terminal to stop data retransmission using a carrier deactivation message, and the terminal receives the carrier deactivation message from the base station, the terminal may perform a deactivation procedure of a corresponding carrier and, simultaneously (or before/after the deactivation procedure), stop all transmission (initial transmission and retransmission) by the carrier.

FIG. 6 is a conceptual diagram illustrating a UL data retransmission stop procedure in a carrier aggregation environment according to the present invention.

In general, a data transmission procedure between the base station and the terminal is accomplished by iterating the base station's initial transmission approval, the terminal's initial data transmission, the base station's data retransmission approval, and the terminal's retransmission operation.

However, in the UL carrier management method according to the present invention, the base station determines a radio channel state (550), and makes a transmission stop instruction 560 to stop transmission by a carrier if the radio channel state of a UL CC received from the terminal is bad. Thus, the base station stops an approval of retransmission by the carrier (570), and the terminal stops a retransmission procedure when receiving the transmission stop instruction (580).

FIG. 7 is a flowchart illustrating the UL carrier management method on the side of the terminal according to the present invention.

Referring to FIG. 7, the UL carrier management method on the side of the terminal according to the present invention may be configured to include the step (S610) of receiving, by the terminal, an instruction to stop data transmission by a UL CC of an unstable radio channel state from the base station and the step (S620) of stopping data retransmission by the designated UL CC when the data transmission stop instruction is received, and initializing a retransmission buffer of the designated UL CC.

First, because the step (S610) of receiving, by the terminal, the data transmission stop instruction to stop the data transmission by the UL CC of the unstable radio channel state from the base station may be configured in correspondence with the method for the data transmission stop instruction transmitted from the base station in step S410 of FIG. 4, redundant description thereof is omitted.

Next, in step S620, the terminal may be configured to stop the data retransmission by the UL CC when receiving the instruction to stop the data transmission by the designated UL CC of the unstable radio channel state, and initialize the retransmission buffer of the designated UL CC.

That is, in step S620, the terminal prevents a modulation operation error related to retransmission by stopping the data retransmission by the designated UL CC and initializing the UL CC or the retransmission buffer. If retransmission by a carrier is stopped, an operation (DRX) for reducing power consumption or a carrier deactivation procedure may be performed.

In the method of the related art, data initially transmitted by a specific UL CC is iteratively retransmitted by a carrier up to a preset maximum number of times (for example, 8 times) even when a radio channel state is unstable. In particular, there is a problem in that the terminal continuously performs retransmission even when the base station does not approve the retransmission in UL differently from DL as described above. In further detail, there is a problem in that the terminal retransmits data by a carrier by determining that a reception error has occurred if a given time has elapsed even when a data retransmission instruction is not received from the base station through a control channel after data transmission. However, in the UL carrier management method according to the present invention, it is possible to reduce power consumption of the terminal, the waste of radio resources due to unnecessary retransmissions, and the degradation of base station performance by preventing an unnecessary retransmission operation when a radio channel state is unstable.

Carrier State Management Method of Base Station and Terminal

On the other hand, in the above-described DL and UL carrier management methods, a deactivation message may be used to signal a data transmission stop instruction and a secondary carrier to be used in communication may be deactivated according to the deactivation message. It should be understood that a secondary-carrier deactivation operation may be applied to a general secondary-carrier deactivation procedure using the deactivation message as well as the case where the deactivation message is used to signal the data transmission stop instruction.

At this time, if the secondary carrier to be used in communication is deactivated, the terminal initializes a buffer to be used for data retransmission of the secondary carrier. Hereinafter, a detailed deactivation procedure will be described.

When use of the secondary carrier is stopped, the base station transmits a secondary-carrier deactivation message to the terminal. Upon receipt of the deactivation message, the terminal changes the secondary carrier to a deactivation state. Here, secondary carriers to be deactivated through a procedure according to the deactivation message include a UL CC and a DL CC.

According to the present invention, a deactivation state change of the terminal includes the following.

A demodulation procedure of a DL secondary carrier is stopped.

Data transmission using a UL secondary carrier is stopped.

A DL retransmission buffer of the secondary carrier is initialized and a retransmission procedure is stopped.

A UL retransmission buffer of the secondary carrier is initialized and a retransmission procedure is stopped.

When the deactivation message has been transmitted, the base station should operate to maintain the same state information for the secondary carrier as the terminal so as to support the deactivation state of the terminal.

Figure 8:
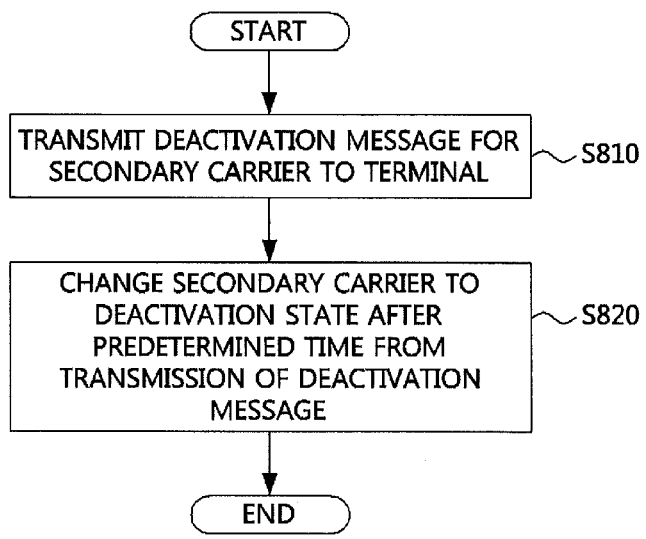
FIG. 8 is a flowchart illustrating an example of a carrier state management method of the base station according to the present invention.
Figure 9:
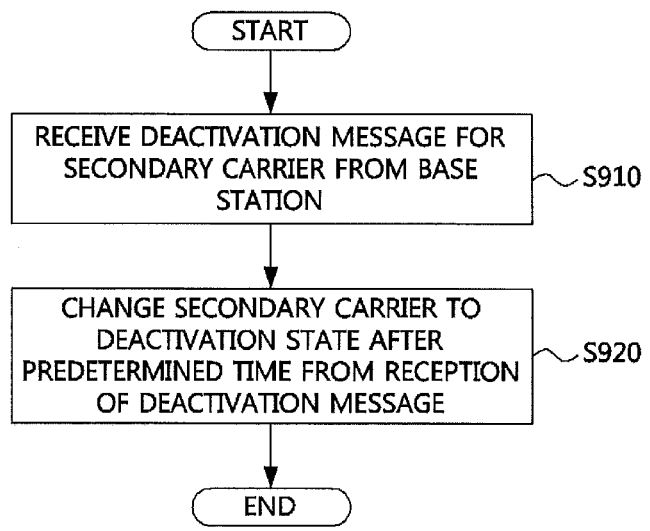
FIG. 9 is a flowchart illustrating an example of a carrier state management method of the terminal according to the present invention.

FIG. 8 is a flowchart illustrating an example of a carrier state management method of the base station according to the present invention, and FIG. 9 is a flowchart illustrating an example of a carrier state management method of the terminal according to the present invention.

Figure 10:
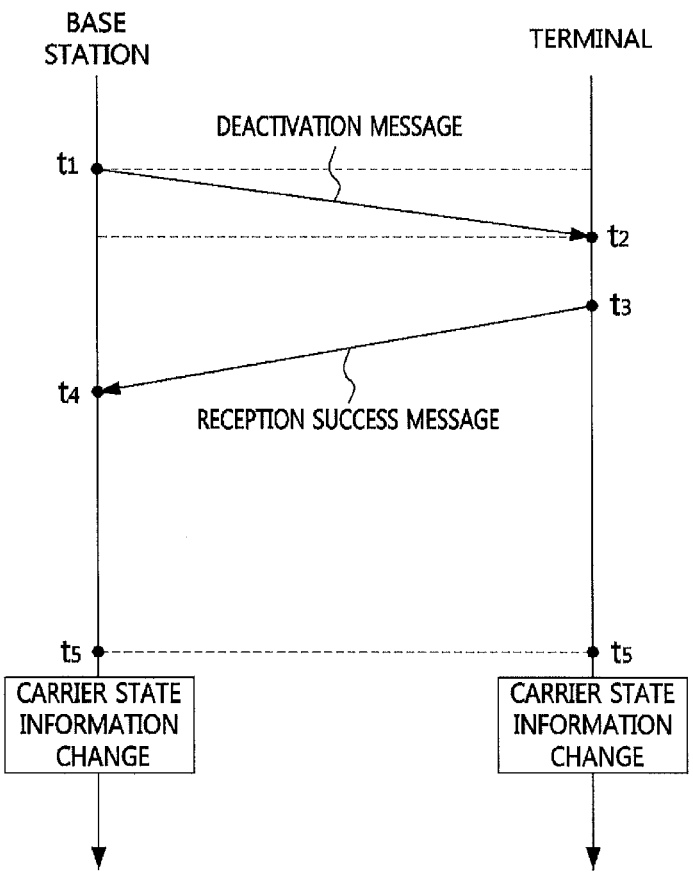
FIG. 10 is a conceptual diagram illustrating a carrier state management method according to the present invention.

In addition, FIG. 10 is a conceptual diagram illustrating a carrier state management method according to the present invention, and illustrates messages exchanged between the base station and the terminal, transmission and reception times of the messages, and operations to be performed on the two sides. In FIG. 10, the vertical axis is the time axis and the vertical downward direction represents the passage of time.

The carrier state management methods of the base station and the terminal will be described with reference to FIGS. 8 and 9 along with FIG. 10.

Referring to FIG. 8, the carrier state management method of the base station according to the present invention may be configured to include the step (S810) of transmitting a deactivation message for a secondary carrier to the terminal and the step (S820) of changing the secondary carrier to the deactivation state after a predetermined time from the transmission of the deactivation message.

The carrier state management method of the base station according to the present invention is used to solve inconsistency of state information and state change times for secondary carriers that are managed by the base station and the terminal in consideration of the occurrence of time delay for deactivation message reception and demodulation until the terminal performs a carrier state change procedure by receiving and demodulating a deactivation message when the base station has transmitted the deactivation message.

Referring to FIG. 10, the base station performs the step (S810 of FIG. 8) of transmitting the deactivation message to the terminal at a time $t_1$. At this time, the base station may stop data transmission and retransmission by a secondary carrier immediately after the transmission of the deactivation message. In addition, the base station may additionally perform the step of stopping DL transmission of the secondary carrier and initializing UL and DL retransmission buffers after the step (S810) of transmitting the deactivation message.

The base station may perform the step (S820) of changing state information for a secondary carrier that is managed by the base station to the deactivation state at a time $t_5$ after the lapse of a predetermined time $(t_5-t_1)$.

On the other hand, the base station may be configured to perform the step of receiving a reception success (acknowledgement) message for the deactivation message from the terminal after the step (S810) of transmitting the deactivation message. In this case, the step (S820) of changing the secondary carrier to the deactivation state may be embodied by changing the secondary carrier to the deactivation state after a predetermined time $(t_5-t_4)$ from a time $t_4$ when the reception success message is received. In general, a difference $(t_4-t_1)$ between the transmission time $t_1$ of the deactivation message of the base station and the reception time $t_4$ of the reception success message transmitted by the terminal is configured to have a fixed value, except for the influence of propagation delay of the reception success message, so that $(t_5-t_1)$ may also be defined if $(t_5-t_4)$ is defined.

On the other hand, the predetermined time may be a value predefined to make state information that is managed by the terminal consistent with state information that is managed by the base station for the secondary carrier.

Next, referring to FIG. 9, the carrier state management method of the terminal according to the present invention may be configured to include the step (S910) of receiving a deactivation message for a secondary carrier from the base station and the step (S920) of changing the secondary carrier to the deactivation state after a predetermined time from the reception of the deactivation message.

The terminal may be configured to stop data transmission and retransmission using the above-described secondary carrier immediately when the deactivation message is successfully received (demodulated) in step S910. In addition, after the step of receiving the deactivation message, the terminal may be configured to additionally perform the step of stopping the UL transmission of the secondary carrier and initializing the UL and DL retransmission buffers.

Thereafter, the base station may perform the step (S920) of changing the secondary carrier that is managed by the base station to the deactivation state at the time $t_5$ after a predetermined time $(t_5-t_2)$ has elapsed from the deactivation message reception $(t_2)$.

On the other hand, the terminal may be configured to transmit the reception success (acknowledgement) message for the deactivation message received from the base station to the base station. In this case, the step (S920) of changing the secondary carrier to the deactivation state may be embodied by changing the secondary carrier to the deactivation state after a predetermined time $(t_5-t_3)$ from a time $t_3$ when the reception success message is transmitted. In general, a difference $(t_3-t_2)$ between the reception time $t_2$ of the deactivation message of the terminal and the transmission time $t_3$ of the reception success message transmitted by the terminal is configured to have a fixed value, so that $(t_5-t_2)$ may also be defined if $(t_5-t_3)$ is defined.

At this time, the predetermined time may be a value predefined to make state information that is managed by the terminal consistent with state information that is managed by the base station for the secondary carrier.

As described above, a predetermined time that is the elapsed time until the base station changes the state information for the secondary carrier to the deactivation state, is configured to be different from a predetermined time that is the elapsed time until the terminal changes the state information for the secondary carrier to the deactivation state. That is, the above-described predetermined times should be set by considering the transmission delays of the deactivation message and the reception success message, processing times required for demodulations thereof, and the like.

On the other hand, the "consistency" of the carrier state information may not mean that state information that is managed by the base station and the terminal should be accurately synchronized and maintained and state change times should be accurately consistent. Although an example in which the base station and the terminal make a carrier state change at the same time $t_5$ is illustrated in FIG. 10, it should be understood that the "consistency" of the carrier state information in the present invention is consistency of a degree in which problems due to differences of state information and change times that are managed by the base station and the terminal may be prevented. For example, the "consistency" may be consistency of a level at which the object of the present invention is satisfied so that a problem does not occur when the terminal manages a secondary carrier in the activation state, even when the base station manages a specific secondary carrier in the deactivation state.

On the other hand, a procedure of changing a secondary carrier to the deactivation state when the deactivation message is not used and the base station and the terminal do not perform communication using the secondary carrier for a given time is also the same as described above.

That is, in another example of the carrier state management method of the base station according to the present invention, the base station may be configured to determine whether or not to change a secondary-carrier state to the deactivation state by determining whether or not transmission/reception through a secondary carrier has been performed for a given time, and change the secondary carrier to the deactivation state after a predetermined time from when the change of the secondary-carrier state to the deactivation state is determined.

In addition, in another example of the carrier state management method of the terminal according to the present invention, the terminal may be configured to determine whether or not to change a secondary-carrier state to the deactivation state by determining whether or not transmission/reception through a secondary carrier has been performed for a given time, and change the secondary carrier to the deactivation state after a predetermined time from when the change of the secondary-carrier state to the deactivation state is determined.

In other examples of the carrier state management methods of the base station and the terminal according to the present invention, it is possible to determine whether or not to change the secondary-carrier state to the deactivation state using a timer. For example, it is possible to determine to change the secondary carrier to the deactivation state by determining that the communication through the secondary carrier has not been performed for the given time upon expiration of the timer of which a value continuously decreases (or increases) while communication through the secondary carrier is not performed. At this time, the timer may be reset every time communication through the secondary carrier is performed.

In the other examples of the carrier state management methods of the base station and the terminal according to the present invention, the predetermined time may be a value predefined to make state information that is managed by the terminal consistent with state information that is managed by the base station for the secondary carrier as described in the example of the carrier state management method. The base station and the terminal may be configured to have different values for the predetermined time.

However, when the base station and the terminal manage separate timers, the timers should be designed so that a procedure of changing a secondary carrier to the deactivation state may be performed at the same time. In addition, the predetermined time should be designed so that carrier state change times of the two sides are consistent.

Because the concept of "consistency" of the carrier state information and the carrier state change time is the same as in the example of the carrier state management method according to the present invention described above, description thereof is omitted.

Details of Secondary-Carrier Deactivation Procedure According to Present Invention In the present invention, the terminal stops a power consumption reduction operation (DRX) for a secondary carrier when the secondary carrier used by the terminal is deactivated. Hereinafter, a detailed procedure will be described.

In the mobile communication system of the multicarrier structure, the power consumption operation of the terminal is performed to control a plurality of carriers in parallel. Thus, the terminal controls a DRX operation according to each multicarrier, and particularly, a timer related to HARQ retransmission control is managed in each HARQ process unit.

More specifically, an HARQ retransmission procedure is performed in units of secondary carriers, and retransmission is performed through the same secondary carrier if initial transmission fails. If data transmission fails, the terminal manages a DRX-retransmission timer and an HARQ round trip time (RTT) timer according to each HARQ process. Accordingly, if the data transmission fails, the HARQ timer is set to 8 for a data block of which transmission fails, and the DRX-retransmission timer is set to a given value. After the terminal is in a sleep mode during 8 subframes according to the set value, the HARQ RTT timer is terminated, the DRX-retransmission timer starts to wake up, and retransmission data is received.

However, when the secondary carrier is deactivated and it is not necessary to perform retransmission, the HARQ RTT timer and the DRX-retransmission timer are initialized so that a wakeup operation for a retransmission procedure is not performed.

Figure 11:
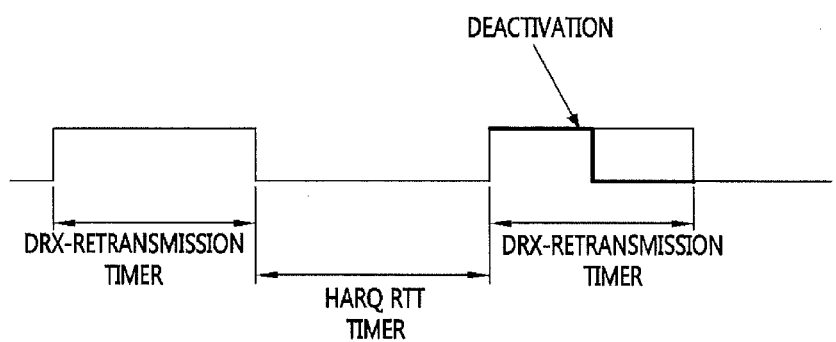
FIG. 11 is a diagram illustrating a secondary-carrier deactivation procedure according to the present invention.

FIG. 11 is a diagram illustrating a secondary-carrier deactivation procedure according to the present invention.

As illustrated in FIG. 11, secondary-carrier retransmission is iterated and the DRX-retransmission timer and the HARQ RTT timer are in operation. At this time, if the deactivation message is received, the terminal terminates the operation of the DRX-retransmission timer and stops an unnecessary wakeup state.

In the present invention, when the secondary carrier is in operation in an on-duration state or is maintained in the wakeup state by an inactivity timer, the terminal immediately stops the on-duration state or the inactivity timer and stops the wakeup operation if a deactivation message of a secondary carrier is received from the base station.

While the present invention have been described above with reference to the above-described embodiments, it will be understood by those skilled in the art that that various changes, substitutions and alterations may be made herein without departing from the spirit and scope of the invention as defined in the following claims.

The invention claimed is:

1. A carrier management method of a base station for use in a carrier aggregation environment, comprising:
   transmitting a deactivation message for a secondary carrier to a terminal;
   changing the secondary carrier to a deactivation state after a predetermined time from the transmission of the deactivation message; and
   stopping downlink (DL) transmission of the secondary carrier and initializing uplink (UL) and DL retransmission buffers after transmitting the deactivation message.

2. The carrier management method of claim 1, wherein the predetermined time is a value predefined to make state information that is managed by the base station consistent with state information that is managed by the terminal for the secondary carrier.

3. The carrier management method of claim 1, further comprising:
   receiving a reception success message for the deactivation message from the terminal after transmitting the deactivation message,
   wherein the changing of the secondary carrier to the deactivation state includes changing, by the base station, the secondary carrier to the deactivation state after a predetermined time from an arrival time of the reception success message.

4. The carrier management method of claim 1, further comprising:
   immediately stopping, by the base station, data transmission and retransmission using the secondary carrier immediately after transmitting the deactivation message.

5. A carrier management method of a terminal for use in a carrier aggregation environment, comprising:
   receiving a deactivation message for a secondary carrier from a base station;
   changing the secondary carrier to a deactivation state after a predetermined time from the reception of the deactivation message; and
   stopping uplink (UL) transmission of the secondary carrier and initializing UL and downlink (DL) retransmission buffers after receiving the deactivation message.

6. The carrier management method of claim 5, wherein the predetermined time is a value predefined to make state information that is managed by the base station consistent with state information that is managed by the terminal for the secondary carrier.

7. The carrier management method of claim 5, further comprising:
   transmitting a reception success message for the deactivation message to the base station after receiving the deactivation message, wherein the changing of the secondary carrier to the deactivation state includes changing, by the terminal, the secondary carrier to the deactivation state after a predetermined time from a transmission time of the reception success message.

8. The carrier management method of claim 5, further comprising:
immediately stopping, by the terminal, data transmission and retransmission using the secondary carrier immediately after receiving the deactivation message.

* * * * *